United States Patent
Bantukul (10) Patent No.: US 8,831,648 B2
(45) Date of Patent: *Sep. 9, 2014

(54) METHODS, SYSTEMS, AND COMPUTER PROGRAM PRODUCTS FOR ROUTING A SHORT MESSAGE SERVICE (SMS) MESSAGE FROM A 2G NETWORK TO A SESSION INITIATION PROTOCOL (SIP)-BASED NETWORK

(75) Inventor: Apirux Bantukul, Cary, NC (US)

(73) Assignee: Tekelec Global, Inc., Morrisville, NC (US)

( * ) Notice: Subject to any disclaimer, the term of this patent is extended or adjusted under 35 U.S.C. 154(b) by 862 days.

This patent is subject to a terminal disclaimer.

(21) Appl. No.: 12/016,314

(22) Filed: Jan. 18, 2008

(65) Prior Publication Data

US 2008/0176589 A1      Jul. 24, 2008

Related U.S. Application Data (60) Provisional application No. 60/881,078, filed on Jan. 18, 2007.

(51) Int. Cl.
*H04Q 7/20*      (2006.01)
*H04W 8/12*      (2009.01)
*H04W 4/14*      (2009.01)

(52) U.S. Cl.
CPC .. *H04W 8/12* (2013.01); *H04W 4/14* (2013.01)
USPC .......................................... 455/466; 455/445

(58) Field of Classification Search
USPC .......... 455/436, 445, 466; 370/219, 224, 252, 370/352, 395.3, 400, 401
See application file for complete search history.

(56) References Cited

U.S. PATENT DOCUMENTS

| | | | |
|---|---|---|---|
| 7,248,851 B2 | 7/2007 | Lee et al. | |
| 7,395,336 B1* | 7/2008 | Santharam et al. | 709/227 |
| 7,792,906 B2* | 9/2010 | Garcia-Martin et al. | 709/206 |
| 7,996,007 B2 | 8/2011 | Bantukul | |

(Continued)

FOREIGN PATENT DOCUMENTS

WO      WO 2008/088890 A1      7/2008

OTHER PUBLICATIONS

Notification of Transmittal of the International Search Report and the Written Opinion of the International Searching Authority, or the Declaration for International Application No. PCT/US08/00710 (May 23, 2008).

(Continued)

*Primary Examiner* — Myron K Wyche
(74) *Attorney, Agent, or Firm* — Jenkins, Wilson, Taylor & Hunt, P.A.

(57) ABSTRACT

Methods, systems, and computer program products for routing a short message service (SMS) message from a 2G network to a dual mode 2G/session initiation protocol (SIP) device are disclosed. According to one method, at a communications signaling message routing node, a 2G mobility location information query message for obtaining a delivery address for an SMS message to be sent to a dual mode 2G/SIP device roaming in a SIP-based network is received. The mobility location information query message includes a destination subscriber identifier associated with the dual mode 2G/SIP device. SIP mobility location information for the dual mode 2G/SIP device in the SIP-based network is determined based on the destination subscriber identifier. The method also includes providing the SIP mobility location information to a query originator.

22 Claims, 4 Drawing Sheets

(56) References Cited

U.S. PATENT DOCUMENTS

| | | | |
|---|---|---|---|
| 2001/0043577 | A1 | 11/2001 | Barany et al. |
| 2006/0046752 | A1 | 3/2006 | Kalavade |
| 2006/0068762 | A1* | 3/2006 | Baldwin et al. ............ 455/412.1 |
| 2006/0111112 | A1 | 5/2006 | Maveddat |
| 2006/0209794 | A1 | 9/2006 | Bae et al. |
| 2006/0286984 | A1* | 12/2006 | Bonner ......................... 455/445 |
| 2007/0118604 | A1* | 5/2007 | Costa Requena ............. 709/206 |
| 2007/0133574 | A1* | 6/2007 | Tejani et al. ................... 370/401 |
| 2007/0135129 | A1* | 6/2007 | Lucidarme et al. ........... 455/445 |
| 2008/0176597 | A1* | 7/2008 | Bantukul ................... 455/552.1 |

OTHER PUBLICATIONS

Notice of Allowance and Fee(s) Due for U.S. Appl. No. 12/016,563 (Apr. 14, 2011).

Official Action for U.S. Appl. No. 12/016,563 (Oct. 28, 2010).

Communication of European publication number and information on the application of Article 67(3) EPC for Euopean application No. 08724638.5 (Nov. 4, 2009).

Communication of European publication number and information on the application of Article 67(3) EPC for Euopean application No. 08724636.9 (Nov. 4, 2009).

Notification of Transmittal of the International Search Report and the Written Opinion of the International Searching Authority, or the Declaration for International Application No. PCT/US08/00712 (May 20, 2008).

Noting of loss of rights pursuant to Rule 112(1) EPC for European Application No. 08724636.9 (Sep. 17, 2012).

Noting of loss of rights pursuant to Rule 112(1) EPC for European Application No. 08724638.5 (Sep. 7, 2012).

* cited by examiner

METHODS, SYSTEMS, AND COMPUTER PROGRAM PRODUCTS FOR ROUTING A SHORT MESSAGE SERVICE (SMS) MESSAGE FROM A 2G NETWORK TO A SESSION INITIATION PROTOCOL (SIP)-BASED NETWORK

RELATED APPLICATIONS

This application claims the benefit of U.S. Provisional Patent Application Ser. No. 60/881,078 filed Jan. 18, 2007; the disclosure of which is incorporated herein by reference in its entirety.

TECHNICAL FIELD

The subject matter described herein relates to routing short message service (SMS) messages in communications networks. More specifically, the subject matter relates to methods, systems, and computer program products for routing a SMS message from a 2G network to a session initiation protocol (SIP)-based network.

BACKGROUND

Modern communications networks may be composed of a variety of different networking technologies, and therefore, modern mobile handsets are often capable of operating in more than one type of network. For example, a subscriber may roam between a 2G network and a session initiation protocol (SIP)-based network while using a mobile dual mode handset device. Exemplary 2G networks include global system for mobile communications (GSM), code division multiple access (CDMA) networks, and time division multiple access (TDMA) networks. Similarly, exemplary SIP-based networks include WiFi, worldwide interoperability for microwave access (WiMAX), Internet multimedia subsystem (IMS), and next generation network (NGN) networks. Because these different networks may use various signaling messages and network nodes to establish calls and communicate short message service (SMS) messages between subscribers, the steps for determining the availability and location of a destination subscriber may differ depending on the type of network to which the subscriber is connected.

For example, when a mobile subscriber initially connects to a 2G network, the subscriber's mobile handset registers with a home location register (HLR) storing location information for the subscriber's handset. The stored location information may include network identification information associated with a mobile switching center (MSC) currently serving the subscriber, such as a network node number (NNN) identifier. Therefore, when another 2G subscriber attempts to send an SMS message to the terminating 2G subscriber, the short message service center (SMSC) for that SMS message attempts to locate the network node (i.e., the node could be the serving MSC or some other like network element) currently serving the destination subscriber's handset. This determination may include querying the HLR associated with the destination subscriber in order to determine whether the destination mobile subscriber device is available to receive the call or SMS message as well as its current location or serving network node.

However, problems arise when the destination subscriber is roaming in a SIP-based network because a conventional HLR located in a 2G network does not contain location routing information for SIP-based network nodes. Therefore, one conventional solution for providing interoperability/roaming of mobile subscribers between 2G and SIP-based networks is to store additional information in the HLR indicating the SIP-based network node serving a roaming destination subscriber.

One problem associated with this conventional method for processing calls and SMS messages traversing between 2G and SIP-based networks is that the HLRs may be overly burdened by having to respond to the large number of routing information request queries associated with such calls or SMS messages. Specifically, as the number of subscribers and routing information request queries associated with these calls or SMS messages increases, so too does the amount of processing resources that must be used to process them. Moreover, modification of the widely deployed system of HLRs in existing 2G networks may be cumbersome and expensive. Therefore, it is desirable to networks operators to have a mobility management solution which includes an inexpensive and feasible modification to existing HLRs and operates transparently to mobile subscribers.

Accordingly, a need exists for improved methods and systems for routing SMS messages from a 2G network to a SIP-based network.

SUMMARY

Methods, systems, and computer program products for routing a short message service (SMS) message from a 2G network to a dual mode 2G/session initiation protocol (SIP) device are disclosed. According to one method, at a communications signaling message routing node, a 2G mobility location information query message for obtaining a delivery address for an SMS message to be sent to a dual mode 2G/SIP device roaming in a SIP-based network is received. The mobility location information query message includes a destination subscriber identifier associated with the dual mode 2G/SIP device. SIP mobility location information for the dual mode 2G/SIP device in the SIP-based network is determined based on the destination subscriber identifier. The method also includes providing the SIP mobility location information to a query originator.

The subject matter described herein for routing an SMS message from a 2G network to a dual mode 2G/SIP device may be implemented using a computer program product comprising computer executable instructions embodied in a tangible computer readable medium that are executed by a computer processor. Exemplary computer readable media suitable for implementing the subject matter described herein includes disk memory devices, programmable logic devices, and application specific integrated circuits. In one implementation, the computer readable medium may include a memory accessible by a processor. The memory may include instructions executable by the processor for implementing any of the methods for routing a SMS message described herein. In addition, a computer readable medium that implements the subject matter described herein may be distributed across multiple physical devices and/or computing platforms.

BRIEF DESCRIPTION OF THE DRAWINGS

The subject matter described herein will now be explained with reference to the accompanying drawings of which.

DETAILED DESCRIPTION

Figure 1:
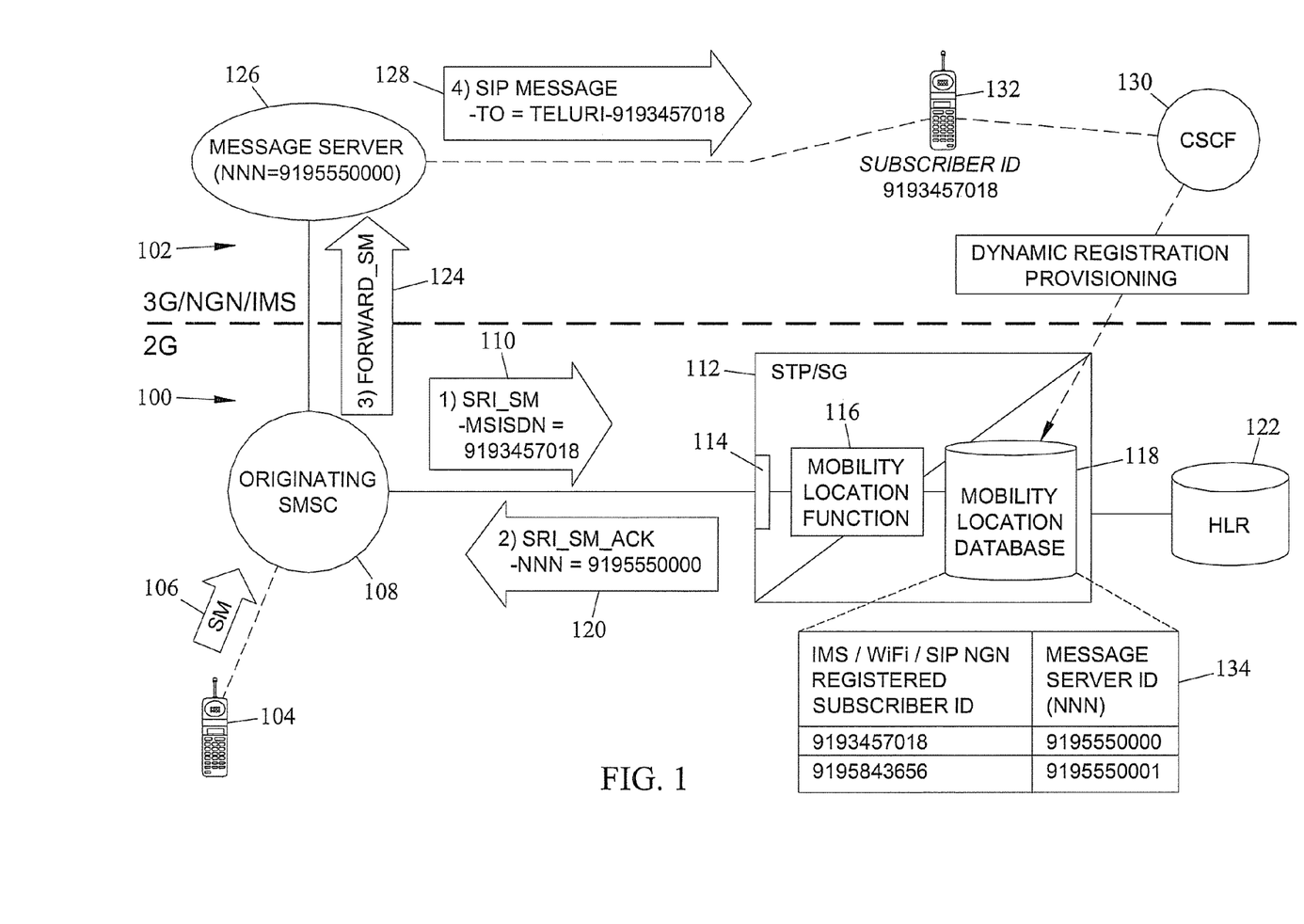
FIG. 1 is a network diagram of an exemplary system for routing a short message service (SMS) message from a 2G network to a dual mode 2G/SIP device operating in a SIP network according to an embodiment of the subject matter described herein.

FIG. 1 is a network diagram of an exemplary system for routing a short message service (SMS) message from a 2G network to a dual mode 2G/SIP device in a SIP-based network. FIG. 1 illustrates both 2G network 100 and SIP-based network 102, where an SMS message originating in 2G network 100 may be terminated in SIP-based network 102. For example, originating mobile device 104 may be used to initiate an SMS message 106 with an originating short message service center (O-SMSC) 108, which functions as a query originator. It is appreciated that 2G network 100 may include one of a GSM, CDMA, TDMA, or other 2G network 100 without departing from the scope of the subject matter described herein. Similarly, SIP-based network 102 may be any SIP-based network including, but not limited to, an IMS, WiFi, WiMAX, or NGN network. In FIG. 1, a plurality of exemplary network elements are shown for the purpose of illustrating one embodiment of the subject matter described herein. Thus, it is further appreciated that other networking elements or configurations, as well as multiple instances of the network elements shown in FIG. 1, may be used.

Upon receiving SMS message 106, O-SMSC 108 may attempt to determine routing information for the message. For example, O-SMSC 108 may generate and send a mobility location information query message 110, which includes a destination subscriber identifier, to a home location register (HLR) 122. In FIG. 1, mobility location information query message 110 is embodied as a short message SendRoutingInformation (SRI) message (i.e., an SRI_SM message) that includes a mobile service identification subscriber directory number (MSISDN) (e.g., 9193457018) associated with a destination mobile subscriber device 132. In an exemplary scenario for provisioning and continually updating mobility location database 118, destination mobile subscriber device 132 may be a dual mode handset capable of operating and roaming in both 2G network 100 and SIP-based network 102. In an alternate implementation, such as an IS-41 implementation, query message 110 may be an SMSREQUEST INVOKE message.

In one embodiment, mobility location information query message 110 may be communicated to HLR 122 via one or more signaling points 112. For example, mobility location information query message 110 may be received at communications port 114 of signal transfer point (STP)/signaling gateway (SG) 112 which is located between O-SMSC 108 and HLR 122. In one embodiment, STP/SG 112 includes a mobility location function 116 and a mobility location database 118. As will be described in more detail below, mobility location function 116 may be responsible for inspecting incoming mobility location information query messages 110 and accessing mobility location database 118 to determine if the destination mobile subscriber device is located in a SIP-based network (e.g., network 102). Mobility location function 116 may be embodied as a hardware component, a software-based program or module, or a combination of both. According to one embodiment, mobility location function 116 and mobility location database 118 may be integrated or co-located with STP/SG 112. In an alternate embodiment, mobility location function 116 and/or mobility location database 118 may be embodied as separate elements that are independent from, yet still accessible by, STP/SG 112. For example, mobility location database 118 may be located on an independent hardware platform and/or server capable of communicating with STP/SG 112 via an Ethernet or like connection.

Returning to the exemplary scenario described above for determining mobility location information, mobility location function 116 may receive or intercept mobility location information query message 110 via communications port 114. In one embodiment, mobility location function 116 may be communicatively coupled to mobility location database 118, which may store one or more registered subscriber identifiers which are associated with a respective one or more message server identifiers or network node number (NNN) identifiers. However, it is appreciated that the information contained in mobility location database 118 may include other types of data without departing from the scope of the subject matter described herein. This information may include an E.164-formatted number, an SS7 point code address, a uniform resource identifier (URI), an Internet protocol (IP) address, or the like.

As mentioned above, mobility location database 118 contains information that may indicate whether a destination mobile subscriber device is located in a SIP-based network. In one embodiment, mobile location database 118 includes one or more tables, such as table 134 shown in FIG. 1, for storing the location information. Notably, table 134 illustrates exemplary information that may be stored in mobility location database 118. Referring to table 134, registered subscriber identifier 9193457018 is stored in a first column entry being associated with message server identifier 9195550000, which is located in a corresponding second column entry. Therefore, a lookup by mobility location function 116 in mobility location database 118 for MSISDN 9193457018 (which is originally acquired from mobility location information query message 110) results in locating the appropriate message server identifier (e.g., NNN identifier 9195550000) that is servicing device 132 in network 102. Based on this determination, mobility location function 116 may then insert the determined message server identifier 9195550000 in a mobility location information acknowledgment message, such as mobility location information response message 120 (e.g., an SRI_SM_Acknowledgement message). Additionally, mobility location information response message 120, which includes the SIP-based network information (e.g., the NNN identifier) determined by mobility location function 116, may be returned to O-SMSC 108 (i.e., the query originator) in order to facilitate the rerouting of SMS message 106 to SIP-based network 102. In this case, mobility location information response message 120 may be transmitted to O-SMSC 108, which in response, may generate a forwarding message that includes SMS message 106, such as FORWARD_SM message 124. In one embodiment, FORWARD SM message 124 may include both the registered subscriber identifier (i.e., 9193457018) associated with the "SIP-located" destination mobile subscriber device 132 and the message server identifier (i.e., NNN=9195550000) of the SIP-based network element serving device 132.

FORWARD_SM message 124 may then be sent to SIP-based network element 126, such as an SMS message server, a media gateway controller (MGC), a softswitch, a session initiation protocol (SIP) gateway, or a SS7 gateway. Network element 126 may then generate a SIP message 128 including the registered subscriber identifier in the "To" field and send the message to destination mobile subscriber device 132. In this way, a 2G originated message may be rerouted to a SIP-based destination for a subscriber roaming in a SIP-based network without burdening 2G HLR resources.

Figure 2:
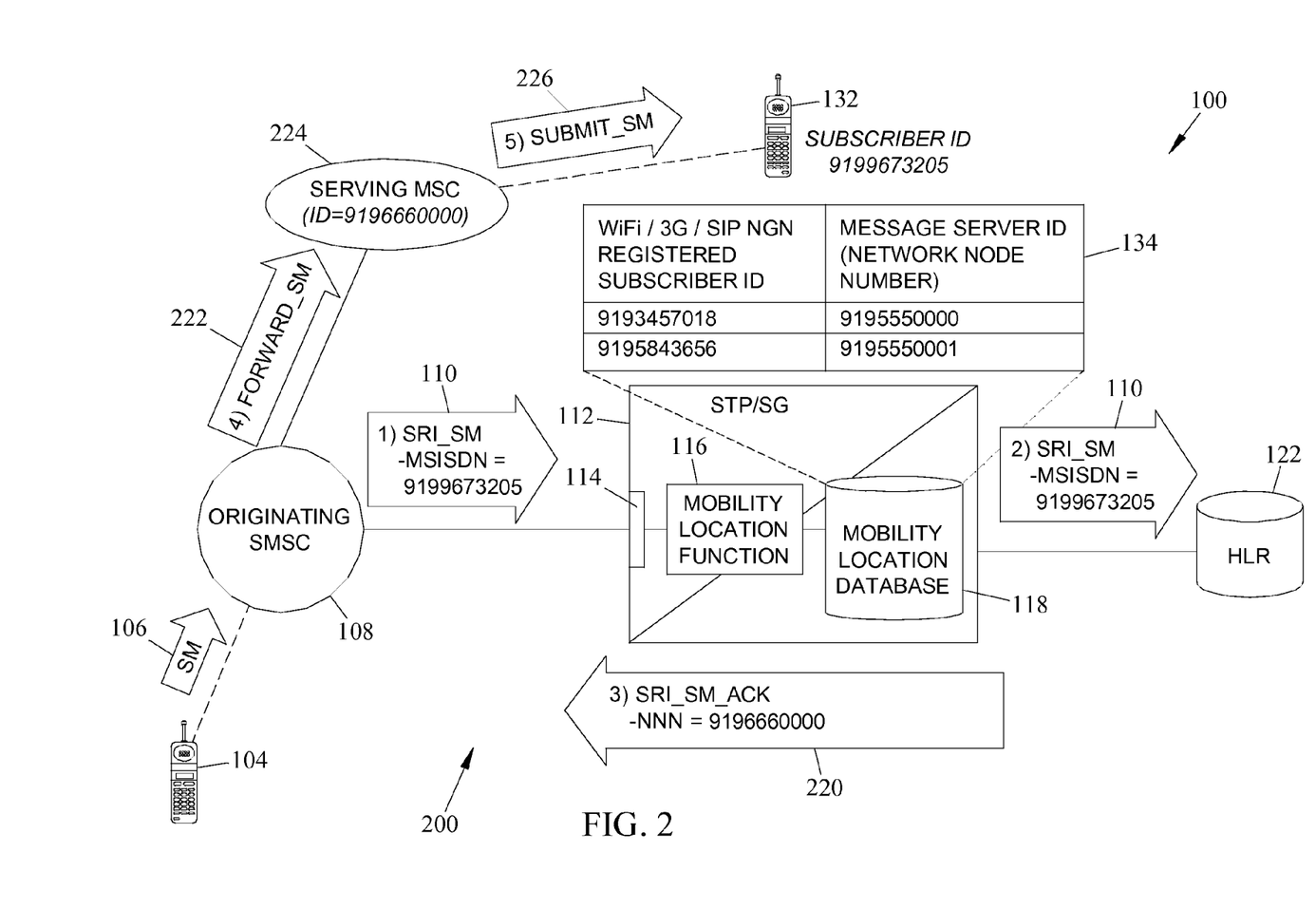
FIG. 2 is a network diagram of an exemplary system for routing a short message service (SMS) message within a 2G network according to an embodiment of the subject matter described herein.

FIG. 2 is a network diagram of an exemplary system for routing an SMS message within a 2G network. Specifically, FIG. 2 illustrates an exemplary sequence of messages when the destination subscriber is not roaming in a SIP-based network and therefore no SIP mobility location information is required. The illustrated scenario begins when originating subscriber device 104 initiating SMS message 106, which is received by O-SMSC 108. Similar to the process described above with respect to FIG. 1, O-SMSC 108 may generate and send a mobility location information query message including a destination subscriber identifier to an appropriate HLR. For example, O-SMSC 108 may send mobility location information query message 110 including MSISDN 919673205 to HLR 122 via STP/SG 112. In this scenario, mobility location function 116 does not find any entries in table 134 that correspond to MSISDN 919673205 and forwards message 110 to HLR 122. HLR 122 responds by processing MSIDN 919673205 and determines that MSC 224 is the network element serving device 132. HLR 122 provides this information to O-SMSC 108 via an SRI_SM_ACK message 220. In response, O-SMSC 108 sends a Forward_SM message 222 to MSC 224, which in turn submits the SMS message to device 132 via message 226.

In one embodiment, mobility location database 118 is provisioned with the NNN identifiers of message servers that are supporting subscribing mobile devices that roam into or within SIP-based networks. Returning to FIG. 1, mobility location database 118 may be provisioned by receiving registration event messages from CSCF 130, which is represented by the "dynamic registration provisioning" block.

In order for mobility location database 118 to receive registration event notification information associated with destination mobile subscriber device 132, STP/SG 112 may submit a subscription request (hereinafter, simply "subscribe") to CSCF 130. This subscription request may identify STP/SG 112 as well as a block of one or more subscriber identifiers for which STP/SG 112 wants to keep track of. For example, the subscription request may require notification of all location registration messages generated by CSCF 130 relating to the aforementioned designated subscriber identifiers. Therefore, once CSCF 130 is made aware of a subscriber roaming in SIP-based network 102 (e.g., a roaming/registration signal sent by device 132), a trigger notification message is sent to STP/SG 112 located in 2G network 100. In this way, dynamic registration provisioning of mobility location database 118 across the network boundary dividing 2G network 100 and SIP-based network 102 is performed according to an embodiment of the subject matter described herein. In an alternate embodiment, STP/SG 112 may submit a subscription request to an IMS home subscriber server (HSS) node (not shown).

Accordingly, when destination mobile subscriber handset 132 is roaming in (or activated within) SIP-based network 102, subscriber handset 132 registers with CSCF 130 indicating that subscriber device 132 is now served by CSCF 130. As described above, this registration message may then be sent to STP/SG 112 located in 2G network 100. In one embodiment, STP/SG 112 forwards the registration message to mobility location function 116 for updating mobility location database 118. Referring to table 134, the registration message may indicate that registered subscriber identifier 9193457018 is associated with message server identifier 9195550000 and, as shown in the first entry of table 134, mobility location database 118 may be populated with this information so that future queries for routing information associated with registered subscriber identifier 9193457018 may provide for routing messages to message server 130 (until a subsequent update message changes this information).

Figure 3:
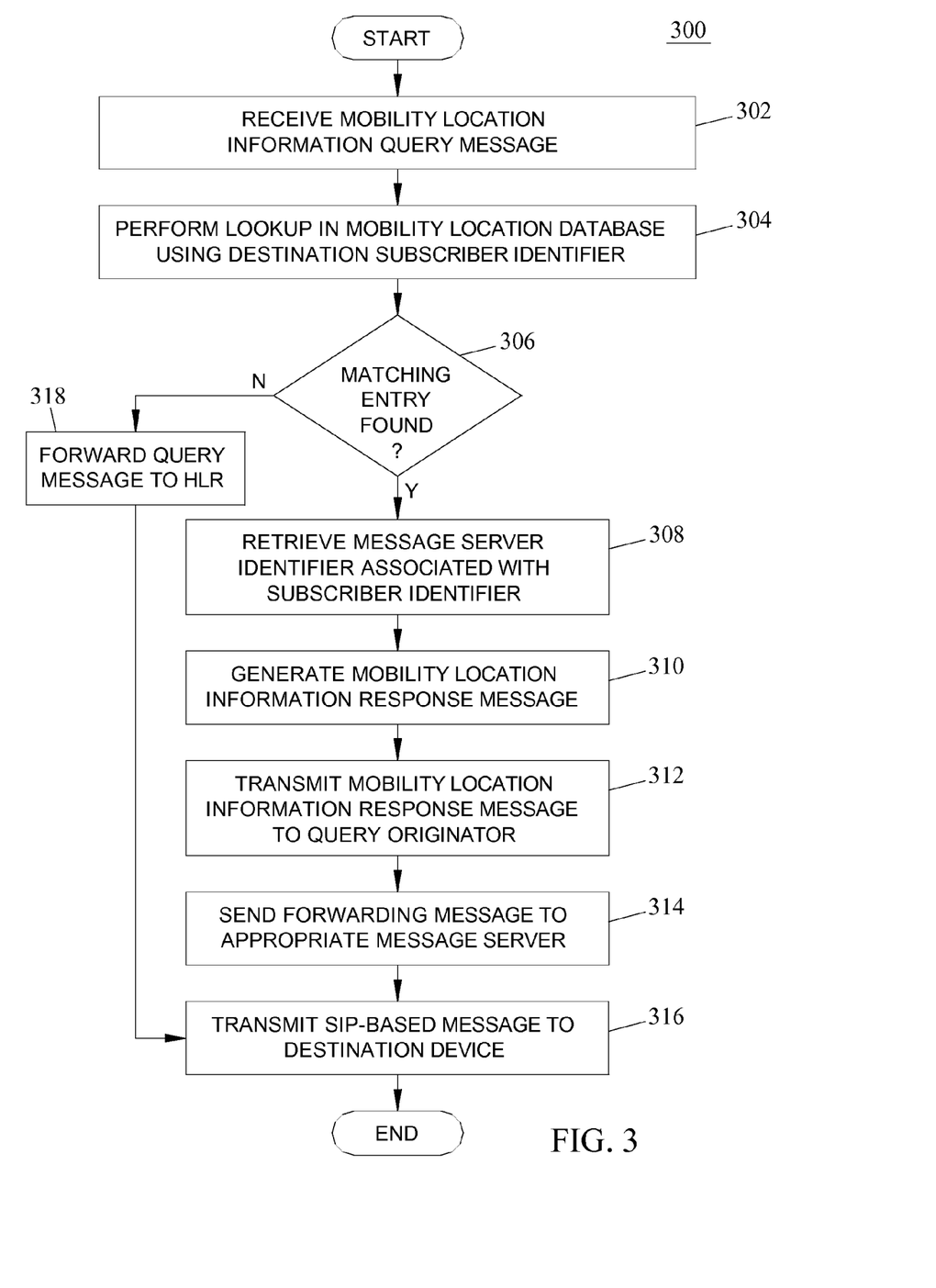
FIG. 3 is a flow chart illustrating exemplary steps for routing a short message service (SMS) message from a 2G network to a dual mode 2G/SIP device according to an embodiment of the subject matter described herein.

FIG. 3 is a flow chart illustrating exemplary steps of a method 300 for routing an SMS message from a 2G network to a dual mode 2G/SIP device in a SIP-based network. In block 302, a mobility location information query message is received. In one embodiment, STP/SG 112 receives an SRI_SM message 110 from O-SMSC 108. Notably, O-SMSC 108 is serving an originating subscriber device 104 (e.g., as a query originator) that is attempting to send SMS message 106 to device 132. Notably, SRI_SM message 110 may include a destination subscriber identifier, such as the phone number of the messaged party (e.g., MSISDN=9193457018, as depicted in FIG. 1).

In block 304, a lookup in a mobility location database using the destination subscriber identifier is performed. In one embodiment, mobility location function 116 queries mobility location database 118 and cross-references the destination subscriber identifier with the entries in table 134.

In block 306, a determination is made as to whether a matching entry in table 134 is found. If the destination subscriber identifier matches an entry in table 134 of mobility location database 118, then method 300 continues to block 308. Otherwise, method 300 proceeds to block 320 where the mobility location function 116 forwards the SRI_SM message to HLR 122 (i.e., the original destination) where query message 110 may be processed normally.

In block 308, a message server identifier associated with the destination subscriber identifier is acquired. In one embodiment, mobility location function 116 retrieves the message server identifier in table 134 that corresponds to the registered subscriber identifier that matches the destination subscriber identifier cross-referenced in block 304.

In block 310, a mobility location information response message is generated. In one embodiment, mobility location information function 112 generates mobility location information response message 120. In one embodiment, mobility location information response message 120 comprises an SRI_SM_Acknowledgement message that includes the message server identifier obtained in block 308 (e.g., a network node number (NNN) identifier). In an alternate embodiment, response message 120 may be an SMSREQUEST RETURN RESULT message.

In block 312, the mobility location information response message is transmitted to the query originator. In one embodiment, mobility location information function 112 transmits SRI_SM_Acknowledgement message 120, which contains the aforementioned message server identifier corresponding to the NGN network servicing the destination subscriber device 132, to O-SMSC 108.

In block 314, the query originator sends a forwarding message to the appropriate message server. In one embodiment, O-SMSC 108 receives SRI_SM Acknowledgement message 120 and transmits a FORWARD_SM message 124 to message server 126, which was identified by the NNN identifier contained in message 120.

In block 316, the recipient message server translates the FORWARD_SM message into an associated SIP message (e.g., SIP MESSAGE method, SIP INFO message) and transmits the SIP-based message to the destination mobile subscriber device. In one embodiment, message server 126 transmits a SIP-based message 128 to the intended destination mobile subscriber device 132. Notably, message 128 contains some or all of the SMS message 106 originally received by O-SMSC 108 from device 104.

Figure 4:
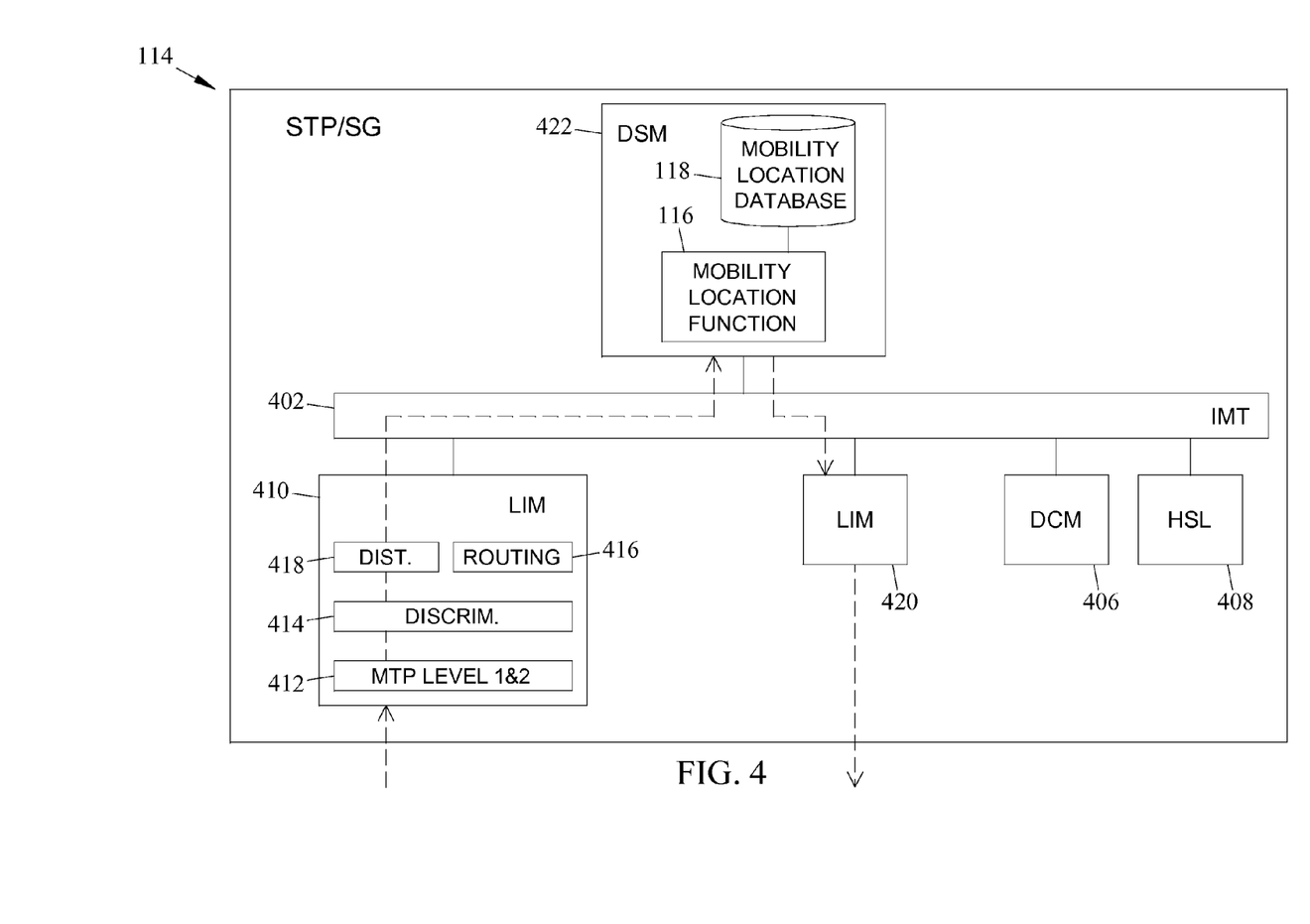
FIG. 4 is a block diagram of a signal transfer point (STP) containing an integrated mobility location function module according to an embodiment of the subject matter described herein.

FIG. 4 is a block diagram of an exemplary internal architecture of a signaling message routing node, such as STP/SG 112, with an integrated mobility location module 116 and an integrated mobility location database 118 according to an embodiment of the subject matter described herein. Referring to FIG. 4, STP/SG 112 may include an internal communications bus 402 that includes two counter-rotating serial rings. In one embodiment, a plurality of processing modules or cards may be coupled to bus 402. In FIG. 4, bus 402 is coupled to one or more communications modules, such as a link interface module (LIM) 410, a data communications module (DCM) 406, a database service module (DSM) 422, and a high speed link (HSL) module 408. Each of these modules is physically connected to bus 402 such that signaling and other types of messages may be routed internally between active cards or modules. LIM 410 includes functionality for sending and receiving SS7 messages via an SS7 network. DCM 406 includes functionality for sending and receiving SS7 messages over IP signaling links. Similarly, HSL module 408 includes functionality for sending and receiving messages over a high speed link.

When a signaling message or SMS message is received by STP/SG 112, the message may be processed by LIM 410, DCM 406, or HSL 408 depending on whether the message is sent over an SS7 link, an IP signaling link, or a high speed link. The message is passed up the communications protocol stack (e.g., MTP level 1&2 processing module 412, discrimination module 414, etc. as shown in LIM 410) on the receiving communication module until the message reaches the module's respective message distribution function 418, which forwards the message to DSM 422. In one embodiment, at least one DSM module 422 in STP/SG 112 is equipped with a mobility location module 116 and mobility location database 118. That is, in one implementation, messages received by LIM 410 or 420, and DCM 406, or HSL 408 may be processed at the mobility function module 116 and identified as candidates for mobility location processing. For example, mobility location function 116 queries mobility location database 118 in the manner described above to determine if the destination mobile subscriber device is positioned in a SIP-based network.

One advantage of the provisioning mobility location database 118 located on STP 112 rather than HLR 122 as described above is that no modifications need to be made to HLR 122. Because typical networks include a large number of HLRs, which may be expensive to modify, using the system described above which interoperates with existing HLRs saves network operators the expense associated with modifying many HLRs. Additionally, the processing capacity of existing HLRs are finite and in high demand in current networks as more and more queries are directed to them and additional network subscribers are added. Therefore, instead of purchasing additional HLRs in order to increase processing resources, network operators may shield existing HLRs from processing queries for subscribers roaming in SIP-based networks, thereby reducing the processing load on existing HLRs.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for routing a short message service (SMS) message from a 2G network to a dual mode 2G/session initiation protocol (SIP) device roaming in a SIP-based network, the method comprising:
at a communications signaling message routing node located in a 2G network and distinct from a home location register (HLR):
intercepting, by the signaling message routing node, a 2G mobility location information query message for obtaining a delivery address for an SMS message to be sent to a dual mode 2G/SIP device roaming in a SIP-based network, wherein the mobility location information query message is initially directed to the HLR from a query originator and includes a destination subscriber identifier associated with the dual mode 2G/SIP device;
determining, using SIP mobility location information stored by the signaling message routing node, SIP mobility location information for the dual mode 2G/SIP device in the SIP-based network based on the destination subscriber identifier, wherein the SIP mobility location information includes SIP-based network routing information, wherein the SIP mobility location information stored by the signaling message routing node is provisioned by at least one call session control function (CSCF) in the SIP-based network; and
providing, by the signaling message routing node, the SIP mobility location information to the query originator.

2. The method of claim 1 wherein intercepting a 2G mobility location information query message includes intercepting a send routing information_short message (SRI_SM) message directed to the HLR.

3. The method of claim 1 comprising, prior to intercepting the 2G mobility location information query message, receiving at least one of a next generation network (NON) registration notification message and an Internet multimedia subsystem (IMS) registration notification message including registration information for the destination subscriber identifier, storing the registration information, and wherein the determining the SIP mobility location information includes using the stored registration information.

4. The method of claim 1 wherein determining SIP mobility location information includes determining at least one of a call session control function (CSCF) identifier, a gateway identifier, an E.164-formatted identifier, a signaling system 7 (SS7) point code address, a uniform resource identifier (URI), and an Internet protocol (IP) address.

5. The method of claim 1 wherein determining SIP mobility location information includes performing a lookup in a mobility location database that contains an at least one destination subscriber identifier and a corresponding at least one SIP-based network node identifier.

6. The method of claim 1 wherein providing the SIP mobility location information comprises generating a mobility routing information response message that includes the SIP mobility location information.

7. The method of claim 6 wherein the SIP mobility location information includes a message server identifier or a network node number (NNN) identifier.

8. The method of claim 1 wherein providing the SIP mobility location information includes transmitting a mobility routing information response message to an originator of the 2G mobility location information query message.

9. The method of claim 1 comprising, forwarding the query message to the HLR in response to failing to determine the SIP mobility location information.

10. A system for routing a short message service (SMS) message from a 2G network to a dual mode 2G/session initiation protocol (SIP) device roaming in a SIP-based network, the system comprising:
a signaling message routing node located in a 2G network and distinct from a home location register (HLR) and including:
a mobility location database located within the signaling message routing node for associating at least one subscriber identifier with SIP mobility location information identifying a location of a dual mode 2G/SIP device roaming in a SIP-based network, wherein the SIP mobility location information includes SIP-based network routing information, and wherein the SIP mobility location information stored by the mobility location database is provisioned by at least one call session control function (CSCF) in the SIP-based network; and
a mobility location function located within the signaling message routing node for intercepting a 2G mobility location information query message requesting a delivery address for delivering an SMS message that is initially directed to the HLR from a query originator and includes a destination subscriber identifier and determining SIP mobility location information based on the destination subscriber identifier by querying the mobility location database using the destination subscriber identifier.

11. The system of claim 10 wherein the mobility location function is located on at least one of a signal transfer point (STP) and a signaling gateway (SG).

12. The system of claim 10 wherein intercepting a 2G mobility location information query message includes intercepting a send routing information_short message (SRI_SM) message directed to the home location register (HLR).

13. The system of claim 10 comprising, prior to intercepting the 2G mobility location information query message, receiving at least one of a next generation network (NGN) registration notification message and an Internet multimedia subsystem (IMS) registration notification message including registration information for the destination subscriber identifier, storing the registration information, and wherein the determining the SIP mobility location information includes using the stored registration information.

14. The system of claim 10 wherein the mobility location function is further adapted to determine at least one of a call session control function (CSCF) identifier, a gateway identifier, an E.164-formatted identifier, a signaling system 7 (SS7) point code address, a uniform resource identifier (URI), and an Internet protocol (IP) address.

15. The system of claim 10 wherein the mobility location database is further adapted to store at least one destination subscriber identifier and a corresponding at least one SIP-based network node identifier.

16. The system of claim 10 wherein the mobility location function is further adapted to generate a mobility routing information response message that includes a SIP-based network node identifier.

17. The system of claim 16 wherein the SIP-based network node identifier includes at least one of a serving call session control function (CSCF) identifier or a network node number (NNN) identifier.

18. The system of claim 16 wherein the mobility location function is further adapted to transmit the mobility routing information response message to an originator of the 2G mobility location information query message.

19. The system of claim 10 wherein the mobility location function is further adapted to forward the query message to a home location register (HLR) in response to failing to determine the SIP mobility location identifier.

20. A computer program product comprising computer executable instructions embodied in a non-transitory computer readable medium and when executed by a processor of a computer performs steps comprising:
at a signaling message routing node located in a 2G network and distinct from a home location register (HLR):
intercepting, by the signaling message routing node, a 2G mobility location information query message for obtaining a delivery address for a short message service (SMS) message to be sent to a dual mode 2G/session initiation protocol (SIP) device roaming in a SIP-based network, wherein the mobility location information query message is initially directed to the HLR from a query originator and includes a destination subscriber identifier associated with the dual mode 2G/SIP device;
determining, using SIP mobility location information stored by the signaling message routing node, SIP mobility location information for the dual mode 2G/SIP device in the SIP-based network based on the destination subscriber identifier, wherein the SIP mobility location information includes SIP-based network routing information, and wherein the SIP mobility location information stored by the signaling message routing node is provisioned by at least one call session control function (CSCF) in the SIP-based network; and
providing, by the signaling message routing node, the SIP mobility location information to the query originator.

21. A method for provisioning a mobility location database, the method comprising:
at a signaling message routing node located in a 2G network and distinct from a home location register (HLR):
subscribing, by the signaling message routing node, to at least one session initiation protocol (SIP) network node to receive SIP mobility location information associated with a dual mode 2G/SIP device when the dual mode 2G/SIP device roams in a SIP-based network and served by the at least one SIP network node;
receiving, by the signaling message routing node, a registration event message including the SIP mobility location information, wherein the SIP mobility location information includes at least one network node number (NNN) identifier associated with the at least one SIP network node and a destination subscriber identifier associated with the dual mode 2G/SIP device; and
provisioning a mobility location database located within the signaling message routing node with the SIP mobility location information which is used to route a short message service (SMS) message to the dual mode 2G/SIP device in the SIP-based network, wherein the SIP mobility location information stored by the signaling message routing node is provisioned by at least one call session control function (CSCF) in the SIP-based network.

22. A system for provisioning a mobility location database, the system comprising:
a signaling message routing node located in a 2G network and distinct from a home location register (HLR) and including:

a mobility location database located within the signaling message routing node for storing session initiation protocol (SIP) mobility location information, wherein the SIP mobility location information includes a destination subscriber identifier associated with the dual mode 2G/SIP device roaming in a SIP-based network and at least one network node number (NNN) identifier associated with at least one SIP network node servicing the dual mode 2G/SIP device; and a mobility location function located within the signaling message routing node for subscribing to the at least one SIP network node to receive the SIP mobility location information when the dual mode 2G/SIP device roams in the SIP-based network and is served by the at least one SIP network node, for receiving a registration event message including the SIP mobility location information, and for provisioning the mobility location database with the SIP mobility location information which is used to route a short message service (SMS) message to the dual mode 2G/SIP device in the SIP-based network, wherein the SIP mobility location information stored by the signaling message routing node is provisioned by at least one call session control function (CSCF) in the SIP-based network.

* * * * *